E. N. CRANE.
Bridle-Bit.
No. 203,001.      Patented April 30, 1878.
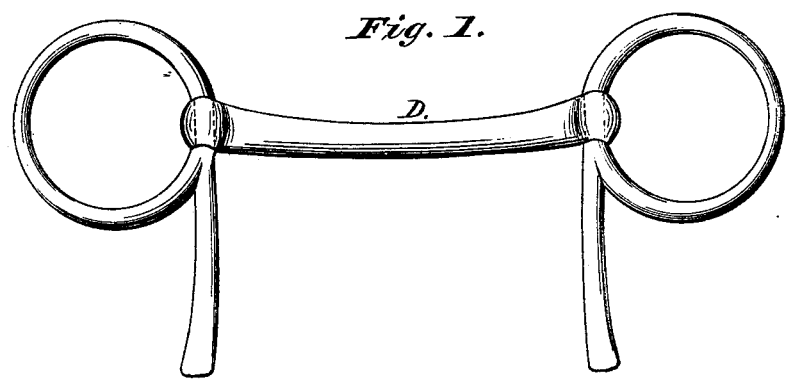
Fig. 1.
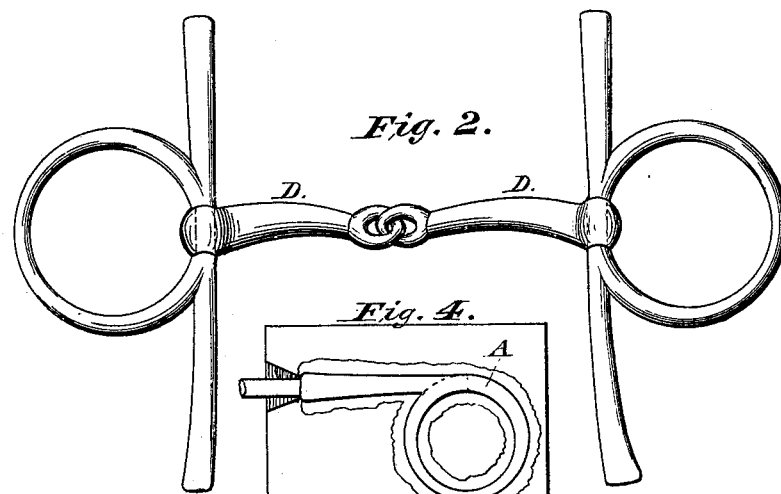
Fig. 2.
Fig. 4.
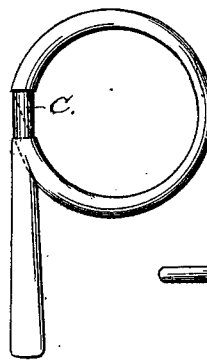
Fig. 4ᵃ.
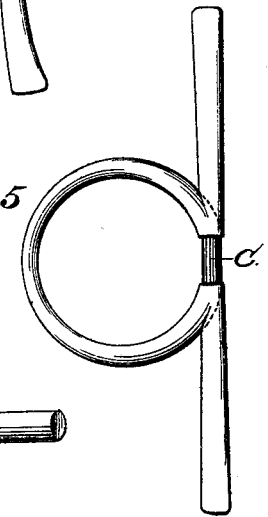
Fig. 5.
Fig. 3.
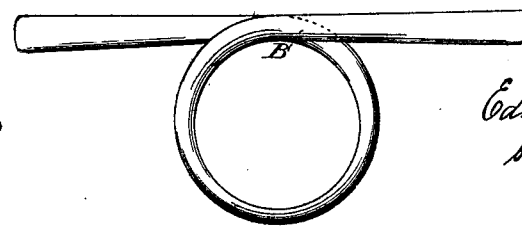
Fig. 6.
Witnesses:
T. C. Brecht
L. P. Cowl
Inventor:
Edward N. Crane
by his Atty.
Wm. G. Henderson

UNITED STATES PATENT OFFICE.

EDWARD N. CRANE, OF NEWARK, NEW JERSEY.

IMPROVEMENT IN BRIDLE-BITS.

Specification forming part of Letters Patent No. 203,001, dated April 30, 1878; application filed December 14, 1877.

*To all whom it may concern:*

Be it known that I, EDWARD N. CRANE, of the city of Newark, in the county of Essex and State of New Jersey, have invented certain new and useful Improvements in Cheek-Pieces of Bridle-Bits; and I do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1 shows a half-cheek snaffle; Fig. 2, a full-cheek snaffle; Fig. 3, a rod of metal, suitably drawn out, for forming a half-cheek snaffle; Fig. 4, a half-cheek as it lies under the die, with the point where the weld is made indicated by dotted lines; Fig. 4$^a$, a half-cheek with mouth-piece detached; Fig. 5, a full cheek with the ring formed of a separate piece of metal, welded at the point indicated by dotted lines; and Fig. 6, a bar of metal, as turned to form a full cheek out of one piece of metal.

My invention has for its object the production of an all wrought-iron or steel bit, whether it be a half or full cheek snaffle, at a cost that will render the bit available for general use.

Bits made wholly of wrought-iron have heretofore been forged by hand on an anvil. When thus made, the manner of proceeding is to take a flat bar of iron, split both ends lengthwise, turn two of the ends toward each other to form the ring, and weld them at a point opposite that where the mouth-piece is to be joined to the cheek; or else a wider bar is punched near its middle, and the hole gradually worked larger, and hammered into shape.

Bits made by the aforesaid methods are quite costly in comparison with those made according to my present invention, the saving in the cost being attributable to the expedition with which my bits can be made; and, further, the weld in the bits made under the old method of slitting and turning is at a very objectionable point, and in the event of even a slight separation the rein is apt to come out of the ring.

The cost of all wrought-iron or steel bits, as heretofore made, has prevented their extensive use.

The present invention consists of an all wrought-iron or steel snaffle-bit cheek, made by stamping the whole cheek in dies of suitable form; and, also, in making the weld of the ring and cheek at a place where the mouth-piece can encircle the weld.

In practicing my invention for a half-snaffle, a piece of merchantable rolled iron of suitable size and shape, usually drawn out as seen in Fig. 3 to save waste, is turned around a "former" into proper shape for the die, into which it is placed at a welding-heat, the parts having first been lapped, as indicated by the dotted lines at A and B, Figs. 4 and 6.

After being placed in the die, the whole cheek, including the loop or ring is welded and shaped at the same operation by one or more blows from a heavy drop-hammer. The article is passed from the die to a cutting-press, in which it is trimmed and put in condition for hanging in the mouth-piece, polishing and finishing.

In forming a full snaffle-bit, the rod of metal is usually slightly reduced in thickness between the two ends, to save waste, and then turned around the former, so as to make a central ring, as seen in Fig. 6; but a straight rod of metal may be used, and either a separate ring or a piece of iron, properly shaped, (whether previously welded or not,) be placed on it, as indicated by the dotted lines in Fig. 5. In both cases the additional steps are the same as those already described for a half-snaffle.

The full and the half snaffle, after being trimmed, appear as represented, respectively, in Figs. 5 and 4, with a depression, C, over which the mouth-piece D fits.

It will be observed that the lap is made at that point of the cheek where the mouth-piece is to be affixed, so that the mouth-piece will fit over the welded joint, and furnish a safeguard against the possibility of the rein slipping through an opening caused by any separation of the metal resulting from a defective weld.

In practicing my invention I do not confine myself to any particular pattern of bit, as the style may be varied as taste dictates, and the bit may be made with a ball-center, such as described in Patent No. 188,726, of March 27, 1877.

Instead of placing a ring on the upright piece of the cheek, there may be placed thereon a segment of a ring.

Having described my invention, what I claim is—

1. A struck-up cheek-piece for bits, formed by turning the bar of metal upon itself, so as to form a ring, and subsequently welding the ring thus formed to the bar, all substantially as herein set forth.

2. A struck-up cheek-piece for bits, formed by placing a circular piece of metal in contact with a metal bar, and subsequently welding the parts thus formed, all substantially as herein set forth.

3. A bridle-bit composed of a mouth-piece and struck-up steel or wrought-iron cheek-pieces, having the ring formed and welded to the upright bar, substantially as set forth.

In testimony that I claim the foregoing as my own I affix my signature in presence of two witnesses.

EDWARD N. CRANE.

Witnesses:
JOSEPH COULT,
E. P. CLARK, Jr.